Nov. 17, 1953  K. K. HUDSON  2,659,298
DRUM TYPE ORANGE JUICER
Filed Sept. 29, 1949  4 Sheets-Sheet 1
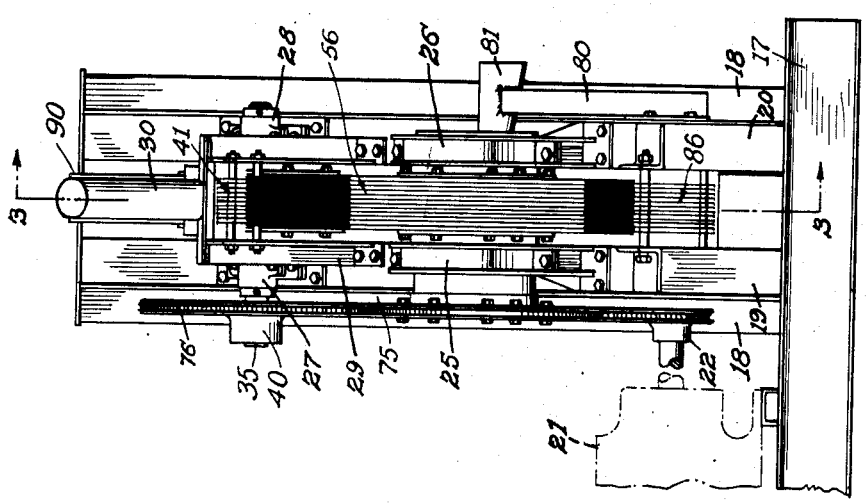
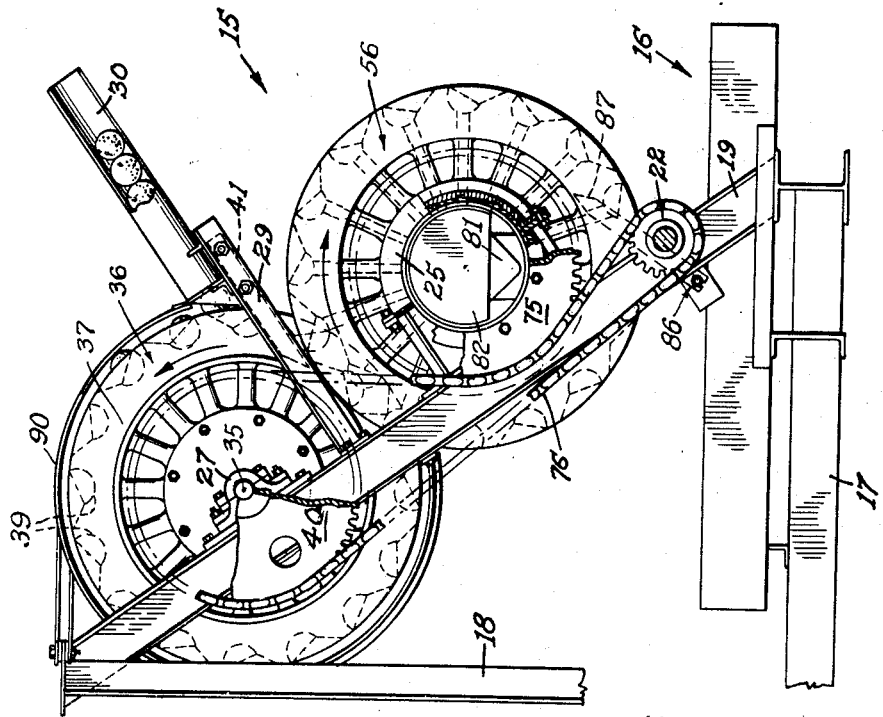
KENNETH K. HUDSON
INVENTOR
BY
ATTORNEY Nov. 17, 1953  K. K. HUDSON  2,659,298
DRUM TYPE ORANGE JUICER
Filed Sept. 29, 1949  4 Sheets-Sheet 2

KENNETH K. HUDSON
INVENTOR

BY

ATTORNEY

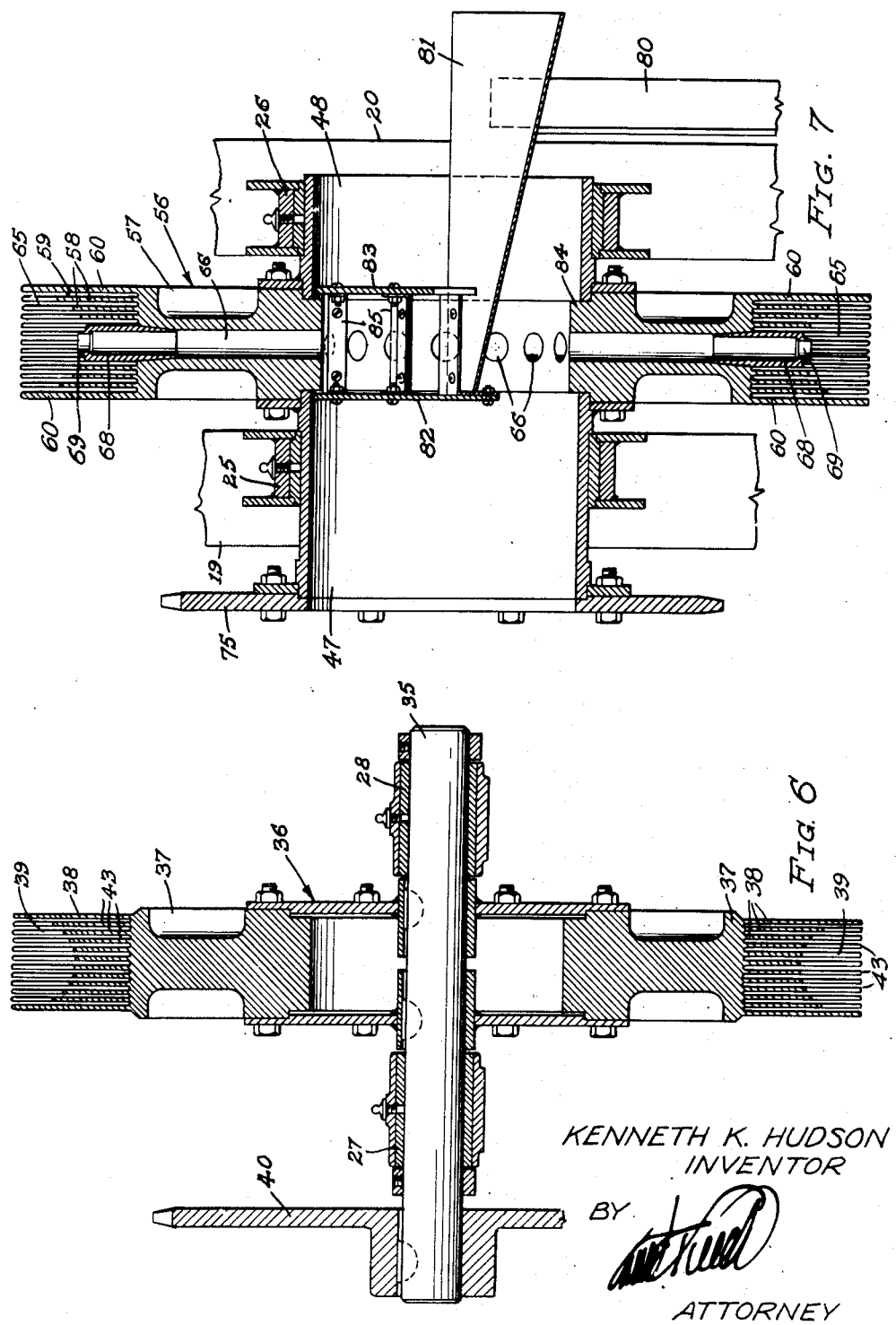

Nov. 17, 1953

K. K. HUDSON 2,659,298

DRUM TYPE ORANGE JUICER

Filed Sept. 29, 1949

KENNETH K. HUDSON
INVENTOR

BY

ATTORNEY

Patented Nov. 17, 1953

2,659,298

UNITED STATES PATENT OFFICE 2,659,298

DRUM TYPE ORANGE JUICER

Kenneth K. Hudson, Tampa, Fla., assignor to Food Machinery and Chemical Corporation, San Jose, Calif., a corporation of Delaware Application September 29, 1949, Serial No. 118,581

10 Claims. (Cl. 100—98)

1

This invention relates to the art of extracting juice from whole citrus fruit.

It is an object of this invention to provide a novel and improved machine for expressing the juice from whole citrus fruit.

It is another object of the invention to provide such a machine which extracts the rind oil from the rind of the fruit simultaneously with the extraction of the juice therefrom and in a manner to permit the separate recovery of the juice and the rind oil.

Another object of the invention is to provide a rotary machine for extracting juice from whole citrus fruit in which the fruit is compressed between two rotary drums and the juice extracted therefrom without the fruit first being halved.

This invention is an improvement on the Apparatus for Extracting Juice From Whole Citrus Fruit shown in the Pipkin patent, No. 2,420,679, issued May 20, 1947. The principle of the Pipkin apparatus is to confine a whole fruit between a pair of opposed cups having hemispheroidal bowl cavities, the side walls of each of said cups comprising a multiplicity of elongated narrow teeth disposed radially and separated by correspondingly narrow slots with the teeth of each cup aligned with the slots of the other cup for interdigitation, then bringing these cups together by a rectilinear movement so as to confine the fruit between the cups and reduce the space therebetween, thereby constricting the fruit, a tubular cutter being provided in the bottom of one of the cups to cut a hole in the rind of the fruit thus constricted, thereby permitting juice to escape from the fruit through said hole as the fruit is compressed into a constantly decreasing space until practically all the juice has been expressed from the fruit.

The necessity for bringing the Pipkin cups together with a rectilinear movement imposes certain restrictions on the design of the Pipkin apparatus. For instance, it is difficult to provide a machine in which more than a relatively few pairs of the Pipkin type cups may be mounted for simultaneous operation in a single machine. This constitutes a limitation on the capacity which can be achieved by a single machine operating on the Pipkin principle.

It is still another object of the present invention to provide an apparatus for expressing juice from whole citrus fruit employing co-operating compression cups which are not limited, as in the Pipkin apparatus, to being brought together by a rectilinear movement.

A still further object of the invention is to

2 provide such an apparatus in which the aforesaid cups may be provided on the peripheries of a pair of coacting drums so that said cups are brought into co-operative compressive relation with the fruit merely by co-ordinate rotation of said drums, thereby greatly simplifying the apparatus, and permitting an individual machine to be built having a relatively large capacity.

The manner of accomplishing the foregoing objects as well as further objects and advantages will be made manifest in the following description taken in connection with the accompanying drawings in which:

Fig. 1 is a side elevational view of a preferred embodiment of the invention.

Fig. 2 is a front elevational view of Fig. 1.

Fig. 6 is an enlarged cross-sectional view of the head wheel of the invention and is taken on the line 6—6 of Fig. 3.

Fig. 7 is an enlarged cross-sectional view of the juice receiving wheel of the invention and is taken on the line 7—7 of Fig. 3.

Figure 4:
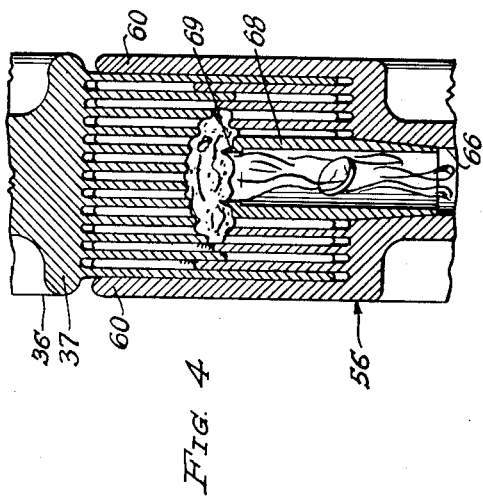
Fig. 4 is an enlarged detail sectional view illustrating the action of the invention on a piece of fruit at the point of maximum compression and is taken on the line 4—4 of Fig. 3.
Figure 5:
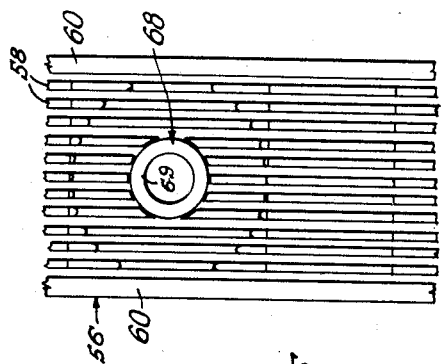
Fig. 5 is a fragmentary elevational view at an enlarged scale taken on the line 5—5 of Fig. 3.

Referring specifically to the drawings, a juice extractor 15 is shown therein having a frame 16 including a base 17 having vertical posts 18 and inclined rotor supports 19 and 20. Mounted on the base 17 is a geared drive motor 21 having a sprocket 22.

The supports 19 and 20 have juice rotor supporting bearings 25 and 26 and head rotor supporting bearings 27 and 28. Also mounted on the supports 19 and 20 is a feed bracket 29 on which is fixed a fruit feed chute 30.

Journalled in the bearings 27 and 28 is a head rotor shaft 35 on which is fixed a head rotor 36 having an annular rim 37 which is shaped, as by machining, to provide a series of thin, flat plates of uniform thickness forming flanges 38 lying in parallel radial planes and separated by narrow, slot-like spaces slightly wider than the thickness of the flanges. The outer edges of certain of these flanges are shaped inwardly to provide a series of equally spaced fruit receiving cups 39 having hemispheroidal bowl cavities.

Also fixed on the shaft 35 is a large diameter drive sprocket 40. Supported on the bracket 29 is a head rotor carcass ejector 41 having a series of blades 42, each of which extends into one of the spaces 43 which separates the adjacent flanges 38.

Figure 3:
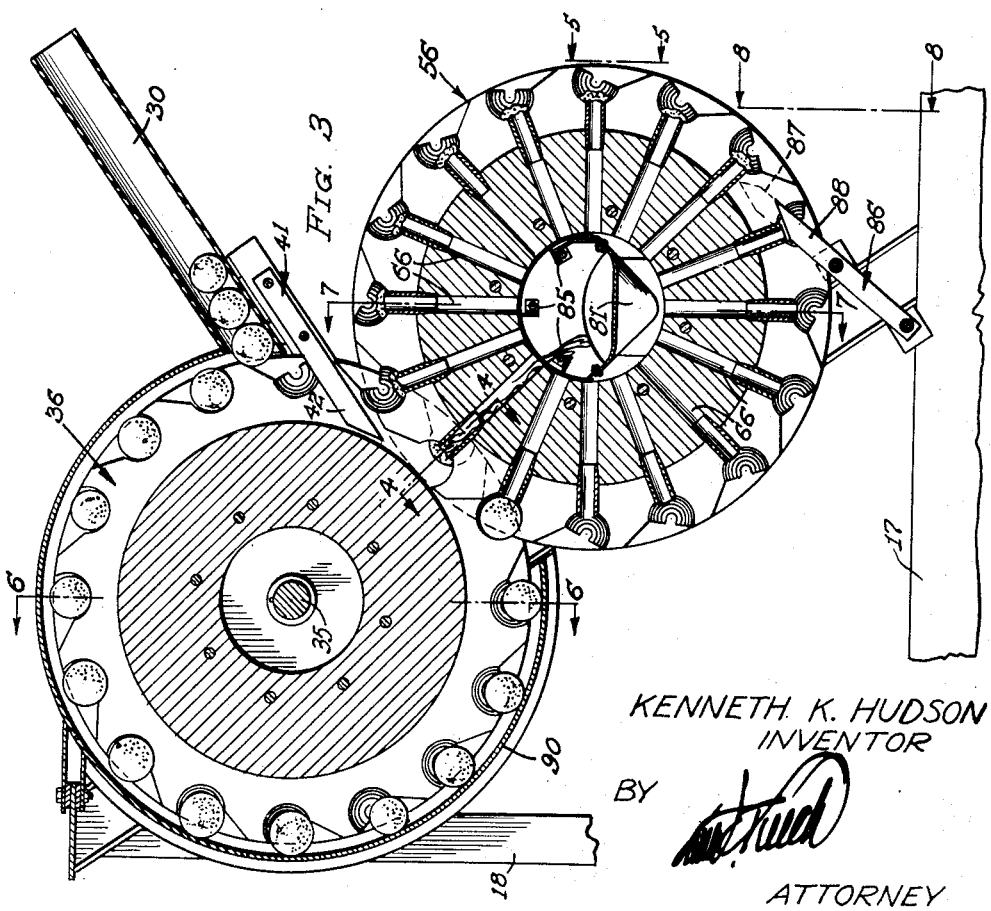
Fig. 3 is an enlarged vertical sectional view taken on the line 3—3 of Fig. 2.
Figure 9:
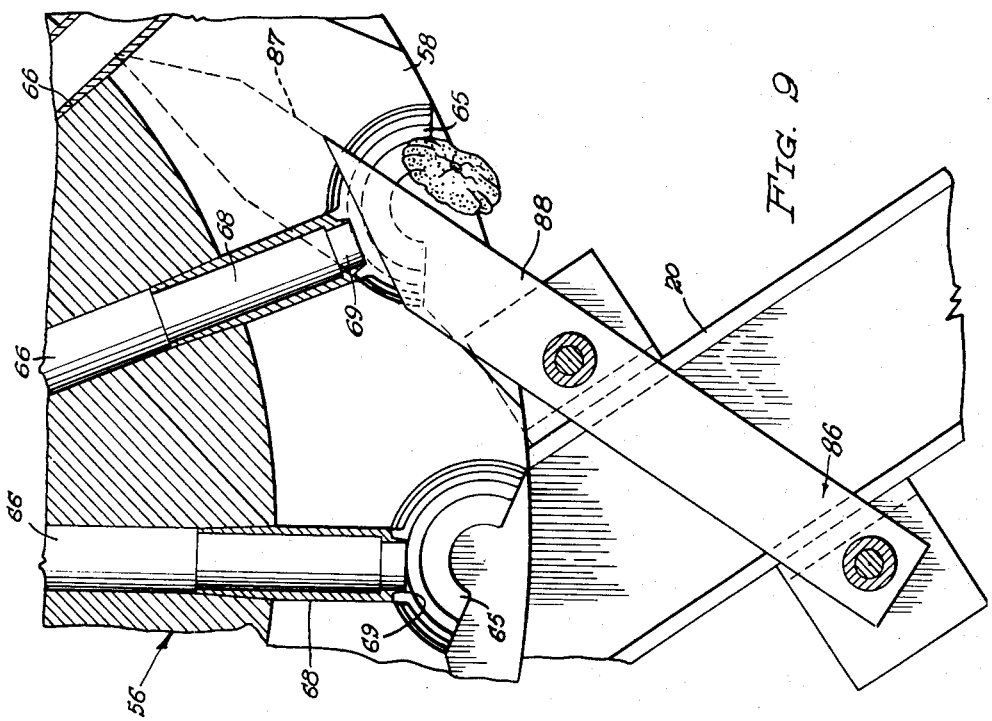
Fig. 9 is a cross-sectional view taken on the line 9—9 of Fig. 8.
Figure 8:
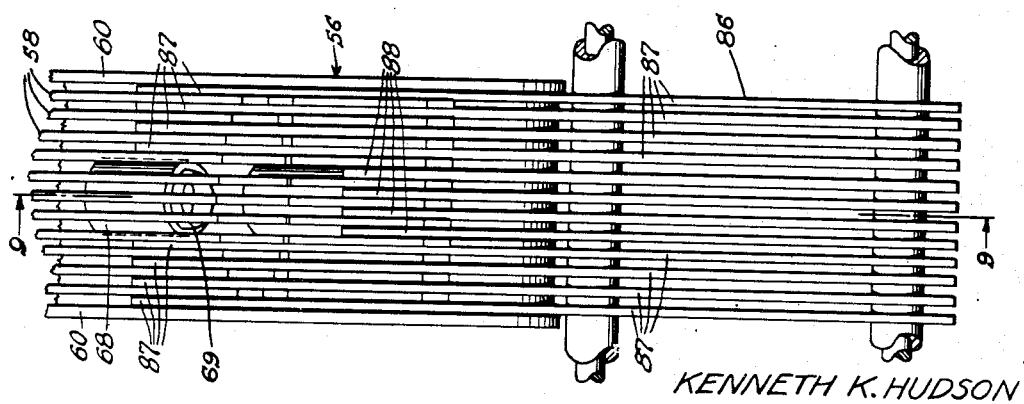
Fig. 8 is a fragmentary enlarged elevational view, taken on the line 8—8 of Fig. 3, illustrating the manner in which the ejector blades extend into slots between the cup forming flanges on the juice receiving wheel.

Journalling in the bearings 25 and 26 are aligned tubular trunnions 47 and 48 of a juice receiving rotor 56, this rotor having a rim 57 which is of the same diameter as the rotor 36 and has a series of annular flanges 58 extending outwardly therefrom in parallel radial planes, these flanges being separated by spaces 59 which are of such a size and so located that the flanges 38 of the rotor 36 are received in the spaces 59 due to the rotors 36 and 56 being disposed close enough together (as shown in Fig. 3) so as to be in meshing or interdigitating relation.

Outermost flanges 60 are provided which are considerably thicker than flanges 58, the flanges 60 giving support to the other flanges during the operation of pressing juice from a whole citrus fruit.

Outer edges of the flanges 58 are cut out to form cups 65 which are equal in number to and equally spaced with the cups 39 on the rotor 36.

Formed radially in the rotor rim 57, to connect with each of the cups 65, is a juice passage 66, the outer end of which is counterbored and tapered to receive a rind cutting nipple 68 which is tubular in character and provided with a circular rind cutter 69 at its outer end, which lies in the bottom of the cup 65 in which the nipple is mounted.

Fixed on the tubular trunnion 47 is a sprocket 75. Trained about the sprockets 22, 40, and 75 is an endless chain 76 through which the rotors 36 and 56 are driven by the motor 21.

Mounted on the support 20 is a bracket 80 having at its upper end a juice trough 81 which extends centrally into the rotor 56 within the trunnion 48 and has plates 82 and 83 which extend outwardly to embrace opposite edges of an inner annular extension 84 of the rim 57, these plates carrying scrapers 85 which scrape the inner surface of the rim 57 to remove pulp which may be hanging in the inner mouths of the juice passages 66.

Mounted on the supports 19 and 20 just below the rotor 56 is a juice rotor carcass ejector 86 including blades 87 which extend into the spaces 59 between the flanges 58, where these are not interrupted by the nipple 68, and blades 88 which extend into spaces 59, which are so interrupted and which are shorter than the blades 87 so as to just skim the ends of the cutters 69 as clearly shown in Fig. 3.

Supported on the frame 16, and extending about the rotor 36 from the fruit chute 30 to where this rotor enters into meshing relation with the rotor 56, is a fruit guard 90 which holds whole pieces of fruit in the cups 39 after these pieces of fruit are fed into these cups 39 and until these cups carry these pieces of fruit into position to be compressed between these two rotors.

These rotors are connected by the chain 76 so that where the flanges of the two rotors interdigitate, the cups 39 and 65 of the two rotors come together to compress each piece of fruit delivered to the zone of interdigitation by the cups 39.

The cups of these two rotors are hemispherical in shape so as to apply pressure substantially equally to all portions of the rind of the fruit as it is compressed between these two rotors excepting the area opposite the circular cutter 69. This cutter penetrates the rind of the fruit forming a hole therein so that, as internal pressure increases in the fruit owing to the area occupied by it constantly decreasing, the juice is squeezed from the fruit and out of the hole thus formed in the rind, this juice flowing through the nipple 68 and juice passage 66 into the juice trough 81 from which it is discharged into a suitable vessel placed to receive it. The button cut from the rind by the cutter 69 is discharged with the juice and separated along with the pulp in the juice finisher (not shown).

The claims are:

1. In a device for extracting juice from whole citrus fruit the combination of: matching cup elements each comprising a base and multiple parallel uniformly spaced plates rigidly united with said base and separated by narrow spaces; means mounting said elements for causing relative movement of said elements to bring the plates of the respective elements into interdigitating relation, the plates of one element then extending into the spaces between the plates of the other element, there being matching cavities formed in the interdigitating edges of said plates to receive a whole citrus fruit when said elements move together; and a device provided on one of said elements in the bottom of the hollow formed therein for forming a hole in the rind of said fruit while it is being compressed between said elements, to permit the escape of juice from said fruit, there being a passage formed in said element and leading from said hole forming means to conduct away juice escaping from said fruit as aforesaid.

2. A combination as in claim 1 in which said mounting means swings said elements into and out of interdigitating relation about axes normal to said plates.

3. In combination: a pair of rotors mounted to rotate on parallel axes, each of said rotors having an annular peripheral set of thin radial plates, separated by narrow annular spaces, said rotors being spaced so that the plates of one rotor extend substantial distances into the spaces between the plates of the other rotor, the outer edges of said sets of plates being hollowed at circumferentially spaced intervals to form matching cups; and means for rotating said rotors in unison so that said matching cups are brought together in the meshing zone of said plates whereby a whole piece of fruit, positioned between a pair of said cups as the latter are brought together as aforesaid, is compressed by the constrictive action of said cups.

4. A combination as in claim 3 in which said constrictive action is sufficient to substantially decrease the volume occupied by said fruit; and means provided within one of the cups of each pair thereof and responsive to said constrictive action to form a hole in the rind of said fruit to facilitate the escape of juice from said fruit during said compresion.

5. A combination as in claim 4 in which the rotor having said hole forming means is provided with juice passages leading from the latter which converge centrally in said rotor; and a juice trough mounted to extend centrally into said last mentioned rotor to receive juice from said juice passages and conduct said juice from said rotor.

6. A combination as in claim 5, there being provided, in the rotor having said hole forming means, an axial bore for receiving said trough, said juice passages opening inwardly into said bore; and a scraper provided on said trough and scraping the inner surface of said bore to deliver to said trough juice flowing into said bore.

7. A combination as in claim 3 in which the outermost plates of one rotor overlap the outermost plates of the other rotor in the zone of meshing between the two sets of plates, said outermost overlapping plates being thicker than the balance of said plates in order to resist outward flexing of said overlapping plates due to the pressure applied to the balance of said plates by the compression of fruit within said cups.

8. In a device for extracting juice from whole citrus fruit, the combination of: a pair of opposed cups having hemispheroidal bowl cavities, the side walls of each of said cups being formed by a multiplicity of parallel thin plates rigidly mounted in spaced relation and separated by correspondingly narrow spaces, the plates of each cup being aligned with the spaces of the other cup for interdigitation, and the cavities of said cups being shaped to conformably contact substantially the entire outer surface of the whole fruit upon initial interdigitation of said plates, the spaces between said plates being formed to permit progressive interdigitation of said plates to express the juice from the fruit without the fruit bursting outwardly from said bowls through the spaces between said plates, and means forming a passage communicating with the interior of at least one of said cups through which the juice may escape from the fruit as such interdigitation proceeds.

9. In a device for extracting juice from whole citrus fruit, the combination of: a pair of opposed cups having hemispheroidal bowl cavities, the side walls of each of said cups being formed by a multiplicity of parallel narrow plates rigidly mounted in spaced relation and separated by correspondingly narrow spaces, the plates of each cup being aligned with the spaces of the other cup for interdigitation, and the cavities of said cups being shaped to conformably contact substantially the entire outer surface of the whole fruit upon initial interdigitation of said plates, the spaces between said plates being formed to permit progressive interdigitation of said plates to express the juice from the fruit without the fruit bursting outwardly from said bowls through the spaces between said plates; means forming a passage communicating with the interior of at least one of said cups through which the juice may escape from the fruit as such interdigitation proceeds; and a tubular cutter surrounding said passage and projecting into the cup having said passage a small fraction of the depth of said cup, the compression of said fruit between said cups operating to press said fruit against said cutter to cut a hole in the fruit rind and to express the juice from the fruit through said hole and into said juice passage.

10. In a device for extracting juice from whole citrus fruit, the combination of: a pair of rotors mounted to rotate on parallel axes, each of said rotors having an annular peripheral set of relatively narrow radial flange plates, separated by correspondingly narrow annular spaces, said rotors being spaced so that the plates of one rotor extend relatively deeply into the spaces between the plates of the other rotor, relatively deep hemispheroidal cavities being formed in outer edges of said sets of plates at circumferentially spaced intervals about the peripheries of said rotors to form matching cups; means for rotating said rotors in unison whereby said matching cups are brought together in the meshing zone of said plates, means to deliver whole citrus fruits between said matching cups as they are thus successively brought together, each of said pair of matching cups being of sufficient depth to conformably contact substantially the entire outer surface of the whole fruit thus fed therebetween upon initial interdigitation of the portions of said plates adjacent said cups, said plates and separating spaces being of sufficient radial depth upon said rotors to permit progressive interdigitation of said plates to express the juice from said whole citrus fruit without the fruit bursting outwardly through the spaces between said plates; and means in one of said rotors providing passages communicating with the interior of the cups formed on said rotor, said passages providing for the escape of juice expressed from said whole citrus fruit.

KENNETH K. HUDSON.

References Cited in the file of this patent

UNITED STATES PATENTS

| Number | Name | Date |
|---|---|---|
| 1,451,164 | Hurter | Apr. 10, 1923 |
| 2,004,056 | Pipkin | June 4, 1935 |
| 2,212,066 | Fry | Aug. 20, 1940 |
| 2,353,841 | McKinnis | July 18, 1944 |
| 2,420,679 | Pipkin | May 20, 1947 |
| 2,463,125 | Smith | Mar. 1, 1949 |
| 2,511,374 | Rahrer | June 13, 1950 |

FOREIGN PATENTS

| Number | Country | Date |
|---|---|---|
| 171,206 | Great Britain | Nov. 17, 1921 |